United States Patent [19]

Masuda et al.

[11] 4,199,958
[45] Apr. 29, 1980

[54] CHILLING APPARATUS FOR BROILER CARCASSES

[75] Inventors: Katsumi Masuda, Ohmiya; Fumiaki Okada, Tokyo; Yoshihiro Nishioka, Osaka, all of Japan

[73] Assignees: Daiken Kogyo Co., Ltd.; Daikin Plant Co., Ltd., both of Osaka; Ijichi Shukeijo Co., Ltd., Kagoshima, all of Japan; part interest to each

[21] Appl. No.: 940,103

[22] Filed: Sep. 6, 1978

[30] Foreign Application Priority Data

Mar. 30, 1978 [JP] Japan .................................. 53/37823

[51] Int. Cl.² ............................................. F25D 17/02
[52] U.S. Cl. ......................................... 62/374; 62/91; 62/380
[58] Field of Search ..................... 62/63, 91, 374, 378, 62/380

[56] References Cited

U.S. PATENT DOCUMENTS

| | | | |
|---|---|---|---|
| 2,065,358 | 12/1936 | Zarotschenzeff | 62/91 |
| 2,489,918 | 11/1949 | Menges | 62/380 |
| 2,705,678 | 4/1955 | Morrison | 62/91 |
| 2,834,188 | 5/1958 | Bradford | 62/91 |
| 2,967,405 | 1/1961 | Taylor | 62/63 |
| 3,164,967 | 1/1965 | Marshall | 62/63 |
| 3,689,958 | 9/1972 | Dillon | 62/63 |
| 3,769,807 | 11/1973 | Foster | 62/380 |
| 3,976,459 | 8/1976 | Ames | 62/380 |

*Primary Examiner*—Ronald C. Capossela
*Attorney, Agent, or Firm*—Stevens, Davis, Miller & Mosher

[57] ABSTRACT

A chilling apparatus for broiler carcasses comprises a chilling room, a conveyor for continuously conveying the carcasses, an air chilling unit for feeding cold air to chill the carcasses in the process of conveyance, and a device for spraying water onto the carcasses during the process of conveyance and chilling, whereby the surfaces of the carcasses are moistened by the water spray and then chilled by cold air.

13 Claims, 12 Drawing Figures

Velocity of Air Flow (m/sec)

FIG.11

CHILLING APPARATUS FOR BROILER CARCASSES

This invention relates to a chilling apparatus for broiler carcasses, and more particularly to the chilling apparatus for broiler carcasses or eviscerated carcasses.

In detail, the usual process of making broilers in a shop is that carcasses of killed, bled, picked-up and singed chickens are washed by water and chilled, or disemboweled and washed and then chilled. The chilled broiler carcasses are cut-up or disposed according to various uses, encased after vacuum-packing or not, and shipped to markets chilled or frozen. The chilling apparatus of the invention is used for chilling the carcasses before cut-up in the aforesaid process at the shop.

The broilers are generally made of chickens 8- to 12 weeks old. Broilers with regard the invention include all young chickens as well as those previously mentioned, and the carcasses with regard to the invention include eviscerated and dressed ones.

Conventionally, such broiler carcasses should be chilled to 10° C. or less, preferably near 0° C., immediately after the killing process because deterioration will begin after several hours when they are left at normal temperature. The carcasses are also chilled rapidly but not frozen from the viewpoint of maintaining the quality of the carcass.

For this purpose, chilled water or ice water as well as dry cold air has previously been widely used for chilling carcasses. The typical spin-chilling method is well-known, in which a tank containing water has crushed ice and a drum can rotatably mounted therein, so that carcasses are put into the can from one end thereof and chilled within the can by agitating the chilled water including no crushed ice and thereafter are taken out from the other end, thus chilling them sequentially.

Such the chilling method takes less time than a dry-chilling method, resulting in good quality, and there is no shrinkage and discoloration as in the dry chilling method. However, a large number of carcasses are continuously soaked in the chilled water stagnating in the tank, whereby some carcasses polluted by bacteria growth, incomplete bleeding, or having muddy legs, contaminate the chilled water, through which even sanitarily processed ones are polluted.

In the bacteria growth, psychrophiles create most problems. The growth of psychrophiles is not fully arrested even with chilling, whereby a slime on the surface of the carcass accompanied by bad smell and discoloration are produced. The aforesaid problem, especially bacterial pollution, may be overcome by adding antibiotics to the chilled water, which is undesirable from the viewpoint of food sanitation.

This invention has been designed to solve the aforesaid problems in the conventional chilling methods. A main object of the invention is to provide a chilling apparatus for chicken carcasses, which presents has no danger of polluting them with each other and of creating shrinkage and discoloration at the carcass surface and which is capable of quickly chilling them at the desired temperature.

The invention is characterized in that the chilling apparatus is provided with at least one air chilling unit for feeding cold air onto the surfaces of carcasses and with a water spray device for spraying water thereon, so that the carcasses are moistened at the surface thereof and also the moist carcasses are chilled by cold air fed from the air chilling unit.

In summary, the carcasses are chilled not by chilled or ice water but by cold air as well as water-spray applied onto the same through the water spray device, whereby moist carcasses are chilled. Hence, the aforesaid problem of pollution resulting from the conventional water-chilling method are solved; good heat-transfer to the carcasses by water and latent heat by water vapour from the moist carcasses quicken the chilling process as much as or more than the conventional method; and deterioration in quality, discoloration at the surface, and shrinkage, caused by having only a cold air blow, are eliminated, thereby improving the chilling effect while keeping the quality of carcass in good condition.

These and other objects and novel features of the invention will be more apparent from the following description of the embodiments thereof in accordance with the accompanying drawings, in which.

The chilling apparatus of the invention is, as shown in FIGS. 1, 2, 9 and 10, mainly composed of; a chilling room 3 having an inlet 31 and outlet 32; a conveyor 8 for conveying broiler carcasses A continuously along the internal transfer path provided within the chilling room 3 between the inlet and the outlet thereof; air chilling units 1 feeding cold air to chill the carcasses A carried along the transfer path; and a water spray device 2 for spraying water onto the carcasses, whereby the carcasses are moistened and the moist carcasses are chilled by cold air emitted from the air chilling units 1.

The air chilling units 1 are, as well-known, connected with a condensing unit (not shown) and employ the direct expansion systems having evaporators 11 and fans 12 circulating cold air respectively, so that the cold air is forcibly fed through a vent of each of the evaporators 11 to blow onto the carcasses in the chilling room 3.

Figure 1:
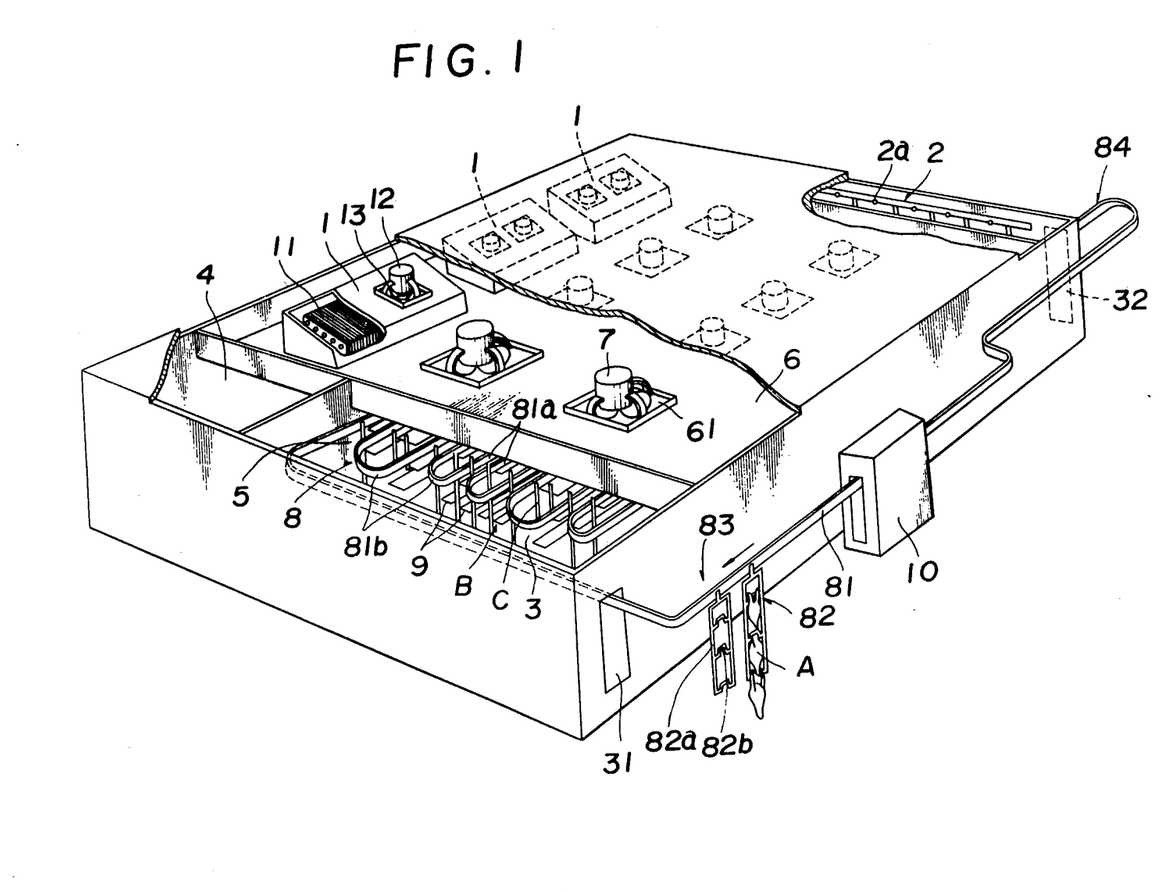
FIG. 1 is a partially cutaway perspective view of an embodiment of the invention.
Figure 2:
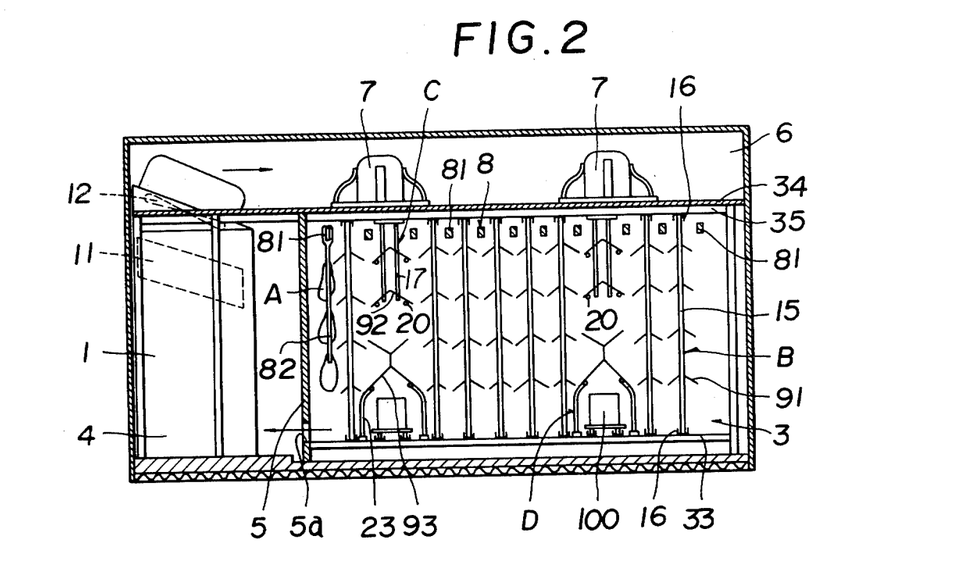
FIG. 2 is a schematic longitudinal sectional view at the left side thereof, FIGS. 3 through 8 showing baffle plates used for the chilling apparatus in FIG. 1.
Figure 9:
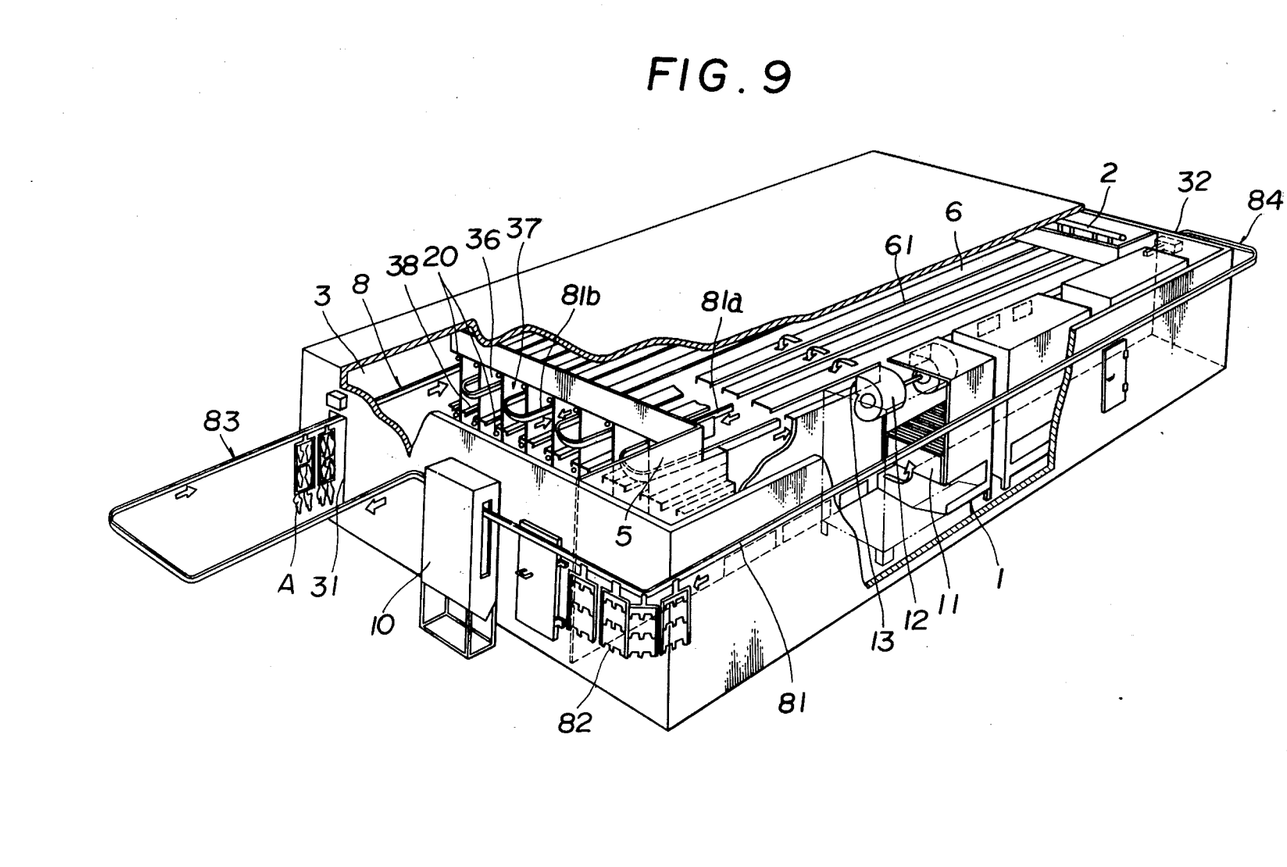
FIG. 9 is a partially cutaway perspective view of a modified embodiment of the invention.
Figure 10:
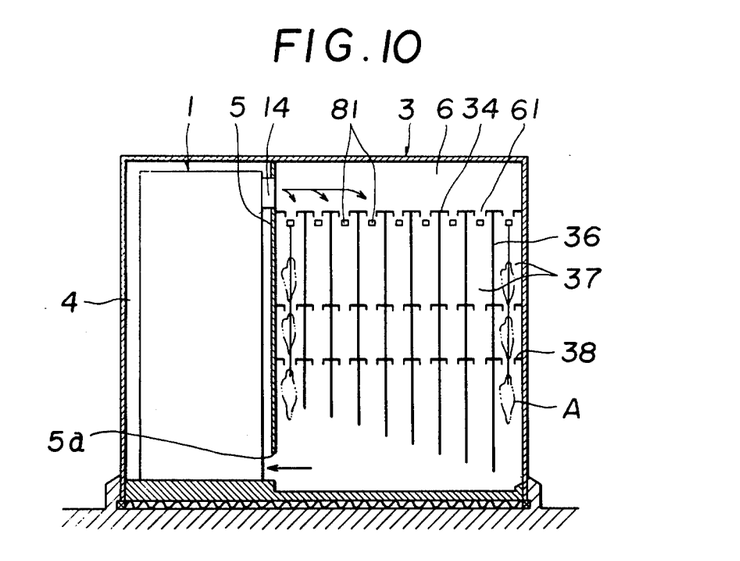
FIG. 10 is a schematic longitudinal sectional view at the right side thereof.
Figure 11:
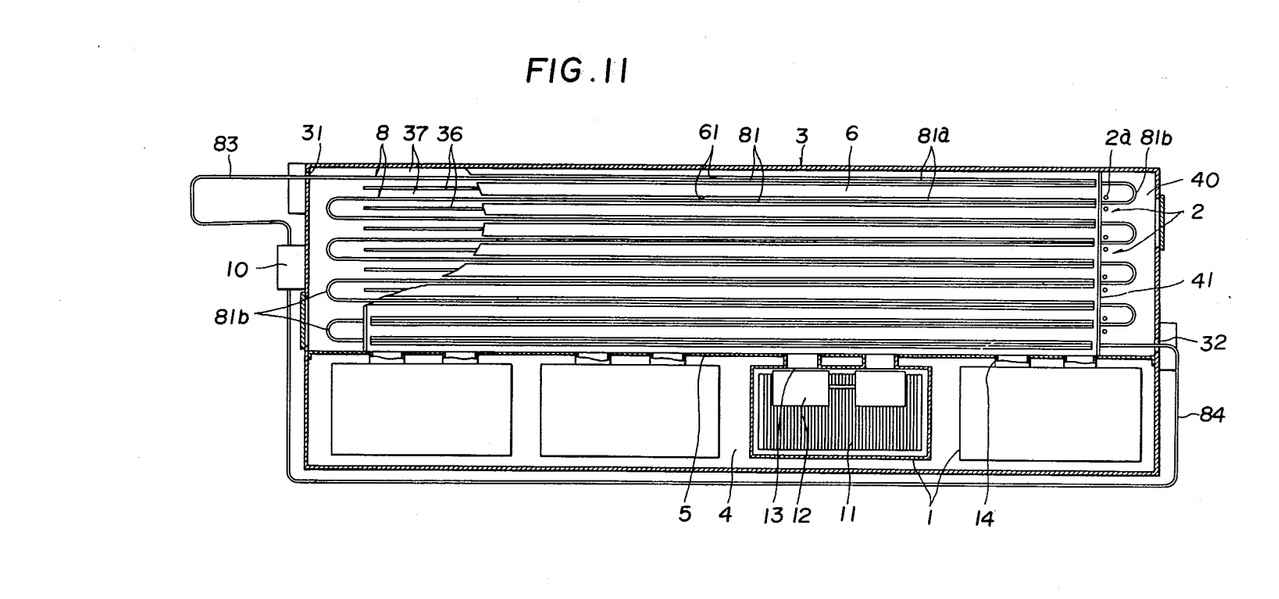
FIG. 11 is a partially cutaway plan view of the embodiment in FIG. 9.

The air chilling units 1 are installed in a machine room 4 separated by a partition 5 from the chilling room 3. When an air chamber 6 is provided above the conveyor 8 at the chilling room 3, blowoffs 13 are, as shown in FIGS. 1 and 2, opened at the air chamber 6 and used to provide the cold air from the air chilling units 1, or vent pipes 14 as shown in FIGS. 9 through 11, are connected to the blowoffs 13 and opened at the air chamber 6 to communicate therewith. While, when no air chamber 6 is used duct-pipings serve to feed the cold air to the chilling room 3.

In addition, the air chilling unit 1 may employ the indirect expansion system which supplies brine to the evaporator 11 from a brine chiller (not shown), or may be formed integral with a compressor and condenser housed in the unit. The condensing unit or brine chiller connected to the unit of separate type should be disposed outdoors.

The water spray device 2 is used for preventing the surface of the carcass from drying up and has a plurality of spray nozzles 2a, through which water pressurized by a water pump is sprayed in mist onto the carcass. The nozzles 2a are dispersed within the chilling room 3, thereby spraying water several times on the carcass A conveyed along the inner transfer path.

The spray nozzles 2a may be arranged at regular intervals along the conveyor 8, but are preferably disposed to face the turn-back portions at the transfer path zigzagged as described hereinafter.

In addition, the aforesaid water pump may be replaced by pressurized water, such as city water, directly supplied to the spray device 2, or by spraying water under gravity from a water tank located above the carcasses.

The water spray may be continuous or intermittent while chilling. The continuous spray makes the surface of carcass moist to a small extent in the whole chilling process and vaporization per unit time is reduced, whereby an amount of water spray per single carcass of unit time is made smaller than that of the intermittent spray.

Pending on a suitable amount of water spray has relationship with the velocity of cold air flow when temperature and relative humidity are constant. When the velocity is too high the carcasses A are quickly dried to increase the required water spray amount. While, when the velocity is too low the chilling takes much time, thereby causing deterioration in quality and reduction in quantities of processed carcasses. Accordingly, the velocity of air flow for practical use should, when each of the carcasses weighs about 1.8 kg on an average, be 0.5 to 5 m/sec, where a range of 2 to 3.5 m/sec is preferable considering the necessary chilling time and drying degree, that is, the necessary water spary amount. From the results of experiments, 2.7 m/sec is most optimum in relationship to the chilling time and water spray amount as aforegoing.

Figure 12:
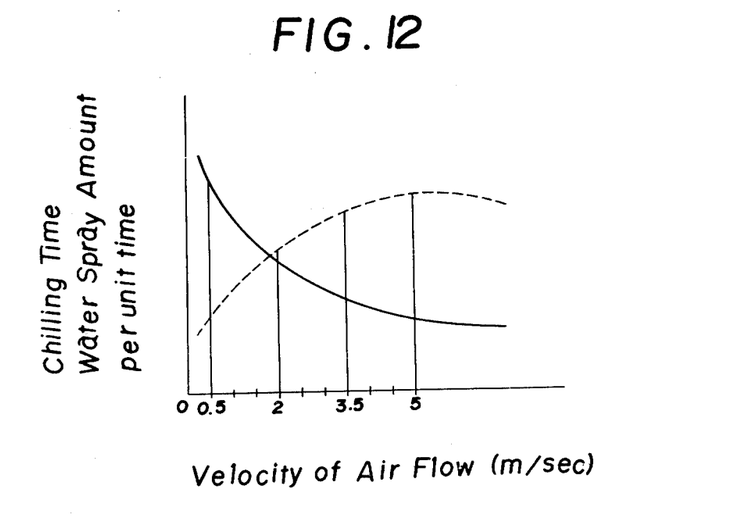
FIG. 12 is a graph showing relation of the velocity of air flow with the chilling time and water-spray amount per unit time.

FIG. 12 represents the relationship of the velocity of air flow vs required chilling time and water spray amount per unit time, in which the water amount shown by the dashed line draws a curve reverse to that of the required chilling time by the solid line (where the former attenuates when the velocity exceeds a certain value), that is, the higher the velocity is, the more the water spary is required due to readily drying, whereby the surface of carcass is dried sooner than chilling by cold air at low velocity. The water spray amount is enough to keep the surface of the carcass moist as too much water causes merely useless consumption thereof.

Hence, the water spray amount attached directed to the carcass surface is, in the aforesaid practical range of velocity of air flow, 30 to 150 cc/hr with respect to one carcass A, and 70 to 100 cc/hr is in the preferable range of the air velocity as aforegoing. Incidentally, 90 cc/hr at 2.7 m/sec is optimum.

Besides this, a intermittent water spray should, under the velocity of 2.7 m/sec, be carried out once to at least 10 minutes for keep the surface of the carcass always moist. The necessary chilling time, which is determined by the velocity of air flow, is about 60 minutes to chill a carcass until 5° C. under the velocity of 2.7 m/sec as aforegoing, where the temperature of chilling air is 0° C. In this instance, the water amount at each carcass surface is 90 cc for the required chilling time. The water of 15 cc is required when sprayed once for 10 minutes, but 15 cc or less is sufficient when increasing spray times at intervals of 10 minutes or less.

The temperature of cold air blowing on the carcasses is preferred to be less than the chilling temperature but not low enough to freeze them, that is, between 5° and −3° C. The water from the water spray device 2 may be at normal temperature but the water warmer than the carcass surface leads to temperature rise thereat, whereby the water is preferably lower in temperature than the carcass surfaces to be sprayed.

In addition, travel speed of the broiler carcasses A is determined by the time necessary for chilling them until the required temperature is reached, in other words, by the temperature required for chilling carcasses A, the temperature and velocity of cold air to be supplied, and the length of a rail 81 to be hereinafter described at the transfer path within the chilling room 3, where the length of rail 81 is determined by the desirable quantities of processed carcasses.

The conveyor 8 comprises the rail 81, a plurality of shackles 82 and drive means (not shown) for moving the shackles 82 along the rail 81, the drive means driving through a drive device a chain connecting therewith the shackles 82.

The rail 81 is suspended upper to the shackles 82 and endlessly across the inside and outside of the chilling room 3 through the inlet 31 and outlet 32 thereof. At the outer transfer path in the vicinity of the inlet 31 at the chilling room 3 is provided a carcass loading station 83 where the carcasses are hung to the shackles 82 and in the vicinity of the outlet 32 a carcass unloading station 84 where the carcasses are removed from the shackles.

The shackle 82 comprises a frame 82a and cross bars 82b. Three carcasses A are, as shown in FIG. 1, hung to the cross bars 82b at three lines in one row and six carcasses A are, as shown in FIG. 9, hung to those at three lines in two rows respectively, the carcasses being hung with the legs above.

The rail 81 may be arranged within the chilling room 3 linearly across the inlet 31 and outlet 32, but it is preferable to provide a plurality of parallel straight portions 81a and turn-back portions 81b connecting each end of each of the straight portions 81a so that the inner transfer path within the chilling room 3 is made zigzagged with the looped turn-back portions.

In this instance, at at least one side where one end of each of the straight portions is positioned and connected to each of the turn-back portions is provided the water spray device 2 for spraying water onto the carcasses. Hence, the water spray device 2 at the turn-back portions 81b facilitates simple pipings for the water and enables the water spray to be concentrated on each carcass, thereby avoiding wasting spray, thus moistening, as required, the carcasses with a small amount of water.

In FIGS. 1 and 2, two pairs of adjacent straight portions of the rail 81 at the transfer path as aforegoing, are spaced at wider intervals than those between other straight portions 81a so that workers may walk through the wider intervals. The air chamber 6 having a plurality of downward blowoffs 61 is provided above the conveyor 8. Within all the intervals between the straight portions of rail 81 are provided baffle plates 9 for guiding the cold air to be well contacted with the carcasses A. The baffle plates 9 are arranged vertically in four lines along the transfer path and each of the hung carcasses is positioned to face each of the vertical intervals between the baffle plates 9.

In FIGS. 1 and 2, the reference numeral 7 designates a fan at each of the blowoffs 61; and 10, a sterilizer. The sterilizer 10 serves to sterilize the shackles 82 by applying boiling water, steam or heated gas, and is provided externally of the chilling room 3 between the inlet 31 and outlet 32, preferably in the vicinity of the carcass loading station 83. The pipes 20 for washing water are arranged along the straight portions 81a within the wider intervals therebetween and have a large number of nozzles (not shown) extending lengthwise of the same.

Accordingly, the carcasses A are chilled in the chilling apparatus shown in FIGS. 1 and 2 in such a manner that the shackles 82 sterilized by the sterilizer 10 load the carcasses with legs extending upward, at the loading station 83, enter into the chilling room 3 through the inlet 31, and travel zigzag along the rail 81 of straight and turn-back portions 81a and 81b, whereby the carcasses on the travelling shackles 82 are subjected to cold air forced to blow out through the blowoffs 61 at the air chamber 6 by means of the driven fans 7. They are sprayed with the water through the nozzles 2a of the water spray device 2 facing the turn-back portions 81b of the rail 81, thus being moistened at the surfaces by the sprayed water and chilled by the cold air.

Next, the carcasses A are, after being chilled and moistened as aforegoing, transferred outwardly of the chilling room 3 through the outlet 32 and removed from the shackles 82 at the unloading station 84. The shackles 82 with no load return to the loading station 83 via the sterilizer 10 along the outside rail 81.

After chilling the carcasses A, the cold air is taken into the air chilling unit 1 through bores 5a provided at the lower end of the partition 5 and is rechilled by the evaporator 11 at the unit 1 and refed into the air chamber 6 from the blowoffs 13 through the fans 12.

Figure 3:
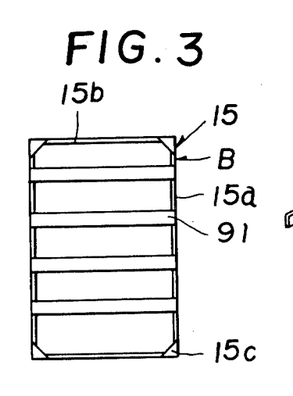
FIG. 3 is a front view of a build-up of fixed baffle plates.

Furthermore, at the chilling apparatus in FIGS. 1 and 2, the baffle plates 9 within the narrow intervals are fixed to vertical members 15a at a frame 15 as shown in FIG. 3, and those at wider intervals are mounted to support frames 17 and 23 as shown in FIGS. 5 through 8 in a folding relationship.

For the convenience of explanation, the fixed baffle plates as aforegoing are represented by the reference numeral 91, and the folding baffle plates called first and second folding baffle plates are represented by the reference numerals 92 and 93 respectively and those including both the fixed and folding baffle plates are represented by 9.

Figure 4:
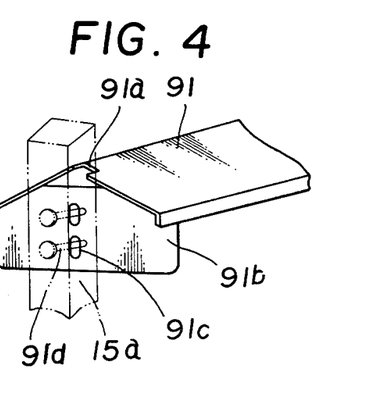
FIG. 4 is a partially perspective view of a fixed baffle plate.

The fixed baffle plates 91 will be detailed in accordance with FIGS. 3 and 4. Each of the fixed baffle plates 91 is formed in a chevron-shape and mounted between the vertical members 15a of the frame 15 composed of the vertical members 15a and horizontal members 15b, which are fixedly joined by corner plates 15c.

The baffle plates 91 are more numerous than the cross bars 82b at the shackle 82 by one, for example, the baffle plates 91 in four lines are mounted to the shackle 82 of three cross bars.

Each of the fixed baffles 91 mounted to the frame 15 in the vertical direction thereof is arranged as shown in FIG. 2. In detail, each of the baffle plates 91 is made smaller in width in regular succession from the uppermost baffle plate to the lowermost one, so that the frame 15 whose fixed baffle plates 91 are made smaller in width downwardly and whose fixed baffle plates 91 are made similarly upwardly, are arranged alternately in the chilling room 3 as shown in FIG. 2.

In other words, the fixed baffle plates 91 and folding baffle plates 92 and 93, are provided at the same level in the chilling room 3 respectively and are horizontally opposite to each other. The opposite baffle plates 91 are arranged vertically continuing at regular intervals therebetween respectively. Now, two opposite fixed baffle plates 91 will be detailed on a basis of the aforesaid construction. When one of the fixed baffle plates 91 is made larger in width the other is made smaller. The intervals of the horizontally opposite fixed baffle plates 91, in other words, the vertically continued intervals through which the shackles 82 travel, are laterally slanted. The reason for this is that the shackles 82 loading the carcasses A are subjected to the weight thereof so as to tend to lean around the supporting point of the same to the rail 81, whereby the intervals constructed according to the foregoing prevent the shackles 82 from leaning into contact with the fixed baffle plates 91. Thus, the fixed baffle plates 91 changed vertically in width and the intervals between the horizontally opposite baffle plates 91 vertically in continuation are advantageous to prevent the shackles 82 from being in contact with the baffle plates 91 even when leaning. The folding baffle plates 92 and 93 opposite to the fixed ones 91 are also applicable with the aforesaid arrangement, in which the folding baffle plates 92 provided vertically and those 93 opposite thereto are changed in width respectively.

Also, a plurality of baffle sets B, which comprise the fixed baffle plates 91 and frame 15, are arranged in series along the straight portions 81a of the rail 81 and are fixed between a floor 33 of the chilling room 3 and a ceiling frame 35 supporting a ceiling 34, i.e., a partition from the air chamber 6, by means of fittings 16 having U-like sections.

Each of the fixed baffle plates 91 is, as shown in FIG. 4, fixed to the vertical members 15a by bolts and nuts 91d through cutouts 91a formed at both ends of the top of the chevron of the same and through mounting plates 91b with bores 91c respectively.

Next, the first and second folding baffle plates 92 and 93 will be detailed in accordance with FIGS. 5 through 8.

Figure 5:
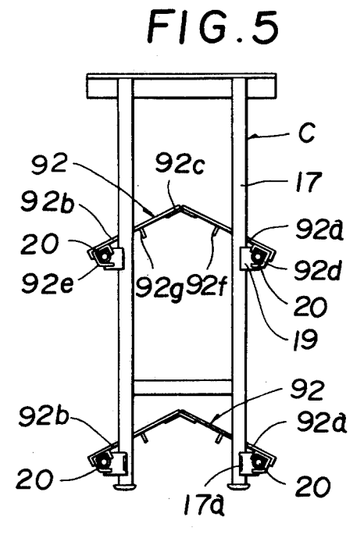
FIG. 5 is a front view of a build-up of first folding baffle plates.
Figure 6:
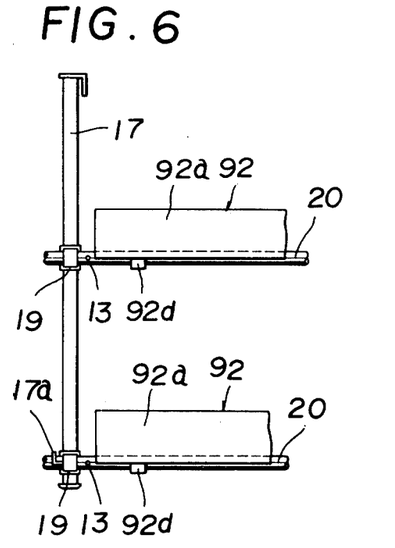
FIG. 6 is a partially omitted side view thereof.

The first folding baffle plates 92 shown in FIGS. 5 and 6 are mounted to a plurality of support frames 17 through the washing water pipes 20, the support frames 17 being fixed to the ceiling support frame 35, and the washing water pipes 20 being attached to the support frame 17.

Each of the first folding baffle plates 92 comprises two plates 92a and 92b which are joined at one end widthwise thereof by hinges 92c and have at the other ends retainers 92d and 92e to be in engagement with the washing water pipes 20 and at the intermediate portions grips 92f and 92g respectively. The engagement of retainers 92d and 92e with the washing water pipes 20 allows each of the baffle plates 92 to be mounted in a chevron shape to the frame 17 vertically in two lines, thus forming a baffle set C of the baffle plates 92 connected with the frame 17.

The folding baffle plates 92 are handled by the worker for cleaning the inside of chilling apparatus. He grips by hand one of the grips 92f and 92g to remove one of the retainers 92d and 92e from the pipe 20, whereby both the plates 92a and 92b are folded and may be hung from the pipe 20 substantially vertically through one of the retainers 92c and 92d.

The washing water pipes 20, which are supported symmetrically to the frame 17 through fixtures 19, are utilized to support the baffle plates 92 respectively. The baffle plates 92 may be supported by support rods other than the pipes 20. It is to be noted that the aforesaid nozzles are required to be provided at only some of the water pipes 20 when supporting the baffle plates 92.

Figure 7:
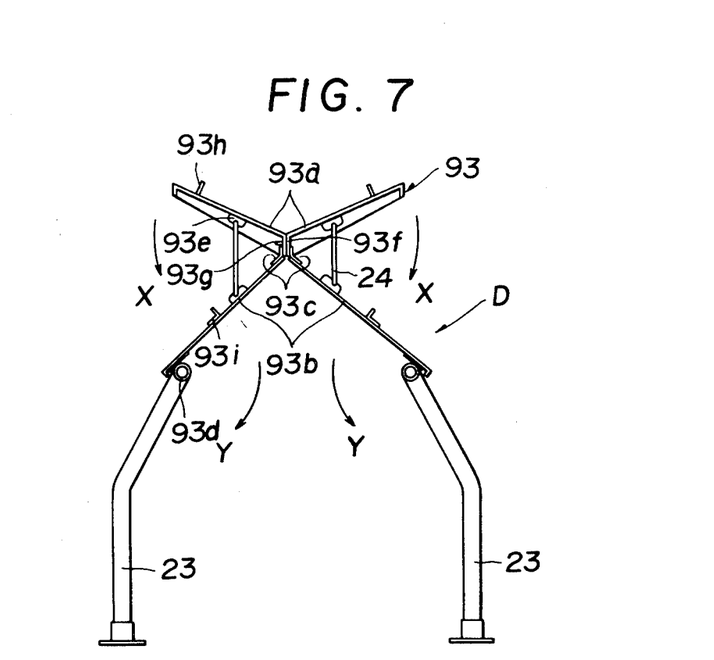
FIG. 7 is a front view of a build-up of second folding baffle plates.
Figure 8:
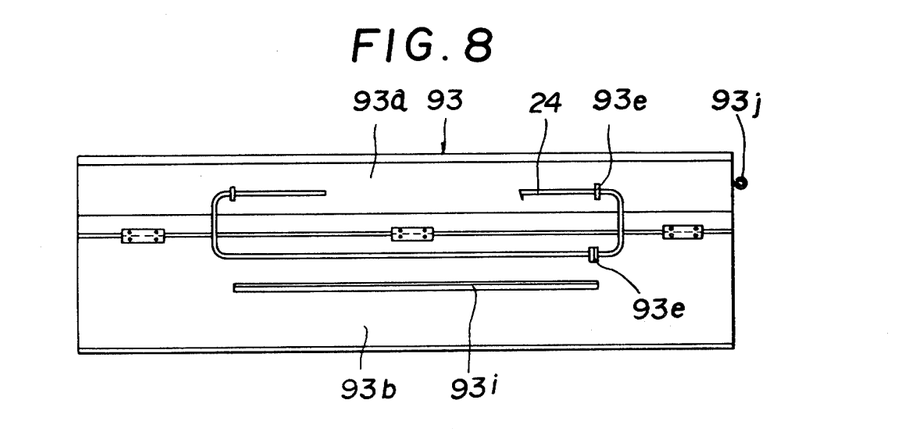
FIG. 8 is a side view thereof.

On the other hand, each of the second folding baffle plates 93 is, as shown in FIG. 7, so constructed that two plates 93a and 93b are connected in a V-like shape with hinges 93c, a pair of such V-like connected baffle plates are abutted back to back at the tops thereof and rotatably supported to the upper ends of a pair of support frames 23 upright to a floor 33, thereby forming a baffle set D by incorporating the frames 23 with the pair of folding baffle plates 93. The lower plates 93b are provided at the lower ends thereof with bearings 93d, thereby being mounted rotatably to the upper ends of support frames 23 respectively. Between the plates 93a and 93b are provided spacers 24 of substantially U-like bent wires in a detachable relationship with the plates through holders 93e. Hence, each of the second folding baffle plates 93 is mounted to the frames 23 in a chevron-shape by means of the spacers 24 as shown in FIG. 7.

In addition, both the V-like shaped baffle plates 93 are abutted back to back at the tops thereof through abutments 93f directed vertically and have projections 93g at one of the abutments and bores at the other for receiving the projections.

When the second folding baffle plates 93, which are abutted back to back and attached with the spacers 24 to be mounted to the frames 23 as shown in FIG. 7, are folded, the spacers 24 are at first removed; the plates 93a are turned in the direction of arrow X in FIG. 7 to be overlapped with the plates 93b respectively; the abutments 93f are disconnected from each other; and the overlapped baffle plates 93a and 93b are turned in the arrow Y direction around the bearings 93d respectively.

In addition, the reference numeral 93h designates a grip; 93i, a reinforcement member; and 93j, a hook. The hook 93j is used to hook one end of a chain supported at the other end thereof to a hook 17a shown in FIGS. 5 and 6, thereby facilitating mounting and folding of the baffle plate 93.

Incidentally, a plurality of the baffle plate sets C and D incorporating the first and second folding baffle plates 92 and 93 respectively are mounted in series along the straight portion 81a of the rail 81 as the same as the aforesaid sets B of the fixed baffle plates 91.

The baffle plates 9 as aforegoing are provided to guide the cold air blowing out from the blowoffs 61 at the air chamber 6 so that the cold air is fed downwardly from the legs to heads of carcass bodies substantially in parallel to the axes thereof, thereby enabling the cold air to chill each of the carcasses uniformly.

Furthermore, the wider intervals between the adjacent straight portions of the rail at the conveyor 8 and the provision of folding baffle plates within the same, cooperatively facilitate the worker's walking and cleaning of the air chilling room 3, especially baffle plates 9. Also, the washing water flowing through the pipes 20 facilitates the cleaning work, and the provision of service trucks 100 within the wider intervals as shown in FIG. 2, further facilitates the cleaning work.

Incidentally, in the construction of FIGS. 1 and 2 the baffle plates 9 provided within the wide intervals may be neglected.

Now, the chilling apparatus shown in FIGS. 9 through 11 will be detailed. The apparatus has slits in place of the downward blowoffs 61 at the air chamber 6 as shown in FIGS. 1 and 2, the slits being extending along the straight portions 81a of the rail 81, whereby the slits 61 can feed therethrough the cold air onto the carcasses downwardly in parallel to the axes of bodies of carcasses with the legs above carcass.

Accordingly, such a construction enables the cold air flow to be oriented without the particular provision of the baffle plates 9. Also, it is preferable that partitions 36 are provided at every slit 61 to divide the chilling room into small chambers 37 including each of the straight portions 81a of the rail 81. When hanging the carcasses vertically in a plurality of lines at the shackles 82, the small chambers 37 are preferred to have therein guide plates 38 for cold air. In addition, the chambers 37 are provided with washing water pipes 20 respectively.

In the chilling apparatus shown in FIGS. 9 through 11, the conveyor 8 is, similarly to that in FIGS. 1 and 2, comprises a rail 81 having a plurality of straight portions 81a and turn-back portions 81b and the water spray device 2 thereat, in which a partition 41 is, as seen from the drawings, provided to separate a spray chamber 40 from the air chilling room 3 and the water spray device 2 is attached to the partition 41, thereby being advantageous to facilitate the drain of sprayed water.

As clearly understood from the aforesaid description, the chilling apparatus of the invention chills the carcasses with cold air and moistens them with water, whereby the carcasses are sanitarily chilled free from contamination from each other. Furthermore, the carcass surfaces are, even though chilled by air, not dried to thereby cause no shrinkage or discoloration, and the cold air blown onto moist carcasses improves the heat transfer from the cold air, as a result, the required chilling time can be reduced in comparison with the chilling by cold air only, thereby chilling the carcasses quickly as much as or more than the chilled water chilling system.

Furthermore, the velocity of cold air flow and amount of water remaining at the carcass surfaces are set up to have relationship with each other, whereby broiler carcasses can be chilled economically without any useless water consumption, and free from shrinkage or deterioration in quality.

While embodiments of the invention have been shown and described, the invention is not limited to the specific construction thereof, which is merely exemplified in the specification rather than defined.

What is claimed is:

1. A chilling apparatus for broiler carcasses, including a chilling room having an inlet and an outlet; a conveyor for continuously conveying said broiler carcasses along an inner transfer path settled within said chilling room between the inlet and outlet of said chilling room; at least one air chilling unit for feeding cold air to chill said carcasses conveyed along said transfer path, said air chilling unit comprising a fan for circulating air and a heat exchanger for chilling the circulating air, and a water spray device for spraying water onto the surfaces of said carcasses in a process of chilling said carcasses; said conveyor comprising a rail, a plurality of shackles mounted movably to said rail, and drive means for moving said shackles, said rail being arranged endlessly across the inside and the outside of said chilling room through said inlet and outlet and above said shackles, said rail having a carcass loading station where said carcasses are loaded on said shackles and a carcass unloading station where said carcasses are removed from said shackles, said loading station being located on an outer transfer path and in the vicinity of said inlet of said chilling room, said unloading station being located on said outer transfer path and in the vicinity of said outlet, said water spray device having a plurality of spray nozzles, said nozzles being arranged within said chilling room so that said nozzles may spray water intermittently a plurality of times onto said carcasses which are being conveyed along said inner transfer path while being chilled in the process of chilling and transfer whereby water sprayed onto the surfaces of said carcasses is drained from said chilling room after spraying, thereby permitting the spraying of clean water onto the surfaces of said carcasses, so that repeated drying of said carcasses by cold air and moistening said dried carcasses occurs during the process of chilling and transferring said carcasses which are being conveyed along said inner transfer path, said water sprayed onto said carcasses from said nozzles being attached to the surface of said carcasses in an amount small enough to prevent said carcasses from being dried.

2. The chilling apparatus for broiler carcasses according to claim 1, wherein said rail at said conveyor within said chilling room is provided with a plurality of straight portions in parallel to each other and a plurality of turn-back portions in continuation of each end of each of said straight portions, and said inner transfer path is zigzagged through said turn-back portions.

3. The chilling apparatus for broiler carcasses according to claim 2, wherein all nozzles of said water spray device for spraying water onto said carcasses are provided to face said turn-back portions in continuation of said straight portions of said rail comprising said inner transfer path, said turn-back portions being at at least one side where one lengthwise end of each of said straight portions is positioned.

4. The chilling apparatus for broiler carcasses according to claim 2, wherein an interval between at least a pair of adjacent straight portions of said rail comprising said inner transfer path is made wider than intervals between other adjacent straight portions, said wider interval being made large enough to permit a worker to walk therein.

5. The chilling apparatus for broiler carcasses according to claim 4, wherein washing water pipes having a plurality of nozzles are disposed along said rail within said wider interval.

6. The chilling apparatus for broiler carcasses according to claim 1, wherein an air chamber having a plurality of blowoffs directed downward is provided above said conveyor at said chilling room, said air chamber communicating with a cold air blowoff at said air chilling unit so that the cold air may blow out downwardly through said blowoffs at said air chamber, whereby said cold air is adapted to be fed onto said carcasses hanging onto said shackles substantially in parallel to the axes extending downwardly of said carcasses respectively.

7. The chilling apparatus for broiler carcasses according to claim 6, wherein said rail at said conveyor provided within said chilling room is provided with a plurality of straight portions in parallel to each other and with a plurality of turn-back portions in continuation of each end of each of said straight portions, said inner transfer path being zigzagged, and said air chamber being provided above said inner transfer path.

8. The chilling apparatus for broiler carcasses according to claim 7, wherein between said adjacent straight portions of said rail below said air chamber are provided baffle plates extending in parallel to said straight portions and vertically in a plurality of lines, so that each of said carcasses may face each vertical interval between said baffle plates, said baffle plates being allowed to guide cold air to each of the plurality of carcasses which are loaded vertically on said shackles.

9. The chilling apparatus for broiler carcasses according to claim 8, wherein an interval between at least one pair of adjacent straight portions of said rail is made wider than intervals between other adjacent straight portions, sufficient to permit a worker to walk within said wide interval, and at said intervals between other adjacent straight portions except for said wider intervals are provided said baffle plates arranged vertically in a plurality of lines.

10. The chilling apparatus for broiler carcasses according to claim 7, wherein said downward blowoffs at said air chamber are formed in slits along said straight portions of said rail so that cold air may blow out through said slits to be fed onto said carcasses in the direction substantially parallel to the axes of the bodies of said carcasses.

11. The chilling apparatus for broiler carcasses according to claim 1, wherein an amount of water sprayed to the surface of each of said carcasses by means of said water spray device is made to be 30 to 150 cc/hr per carcass and the velocity of cold air flow fed to said carcasses from said air chilling unit is made to be 0.5 to 5 m/sec.

12. The chilling apparatus for broiler carcasses according to claim 11, wherein when the velocity of cold air fed to said carcasses from said air chilling unit is made to be substantially 2.7 m/sec, water spray by said water spray device is carried out at least every ten minutes.

13. The chilling apparatus for broiler carcasses according to claim 1, wherein said air chilling unit is allowed to feed through blowoffs thereof said cold air at the temperature of 5° to −3° C. to said carcasses.

* * * * *